W. A. WIDMER.
VARIABLE SPEED GEARING.
APPLICATION FILED MAR. 17, 1909.
928,568.
Patented July 20, 1909.
2 SHEETS—SHEET 1.
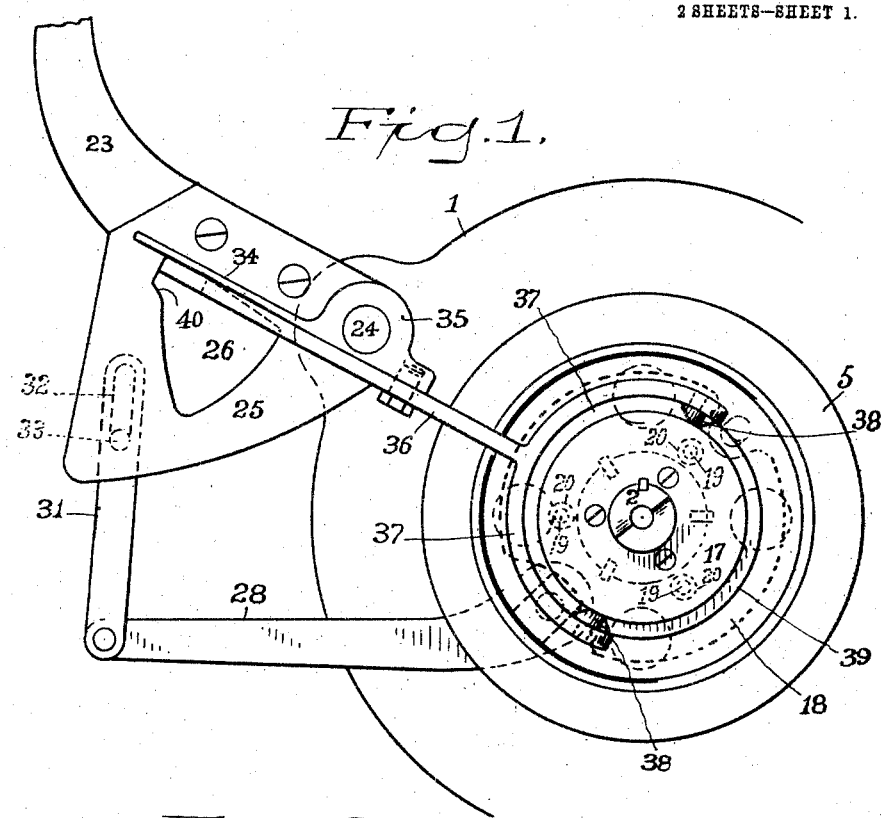
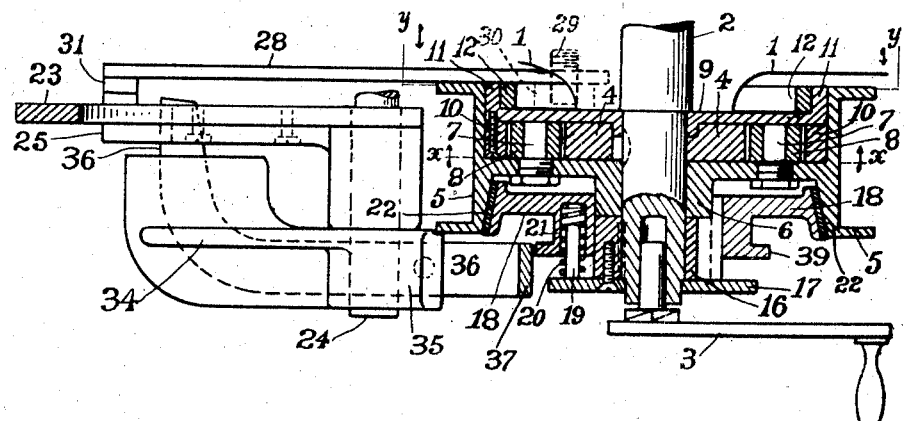
WITNESSES:
H. A. Lamb
M. D. Longden
INVENTOR
Wm. A. Widmer
BY 
ATTORNEY

W. A. WIDMER.
VARIABLE SPEED GEARING.
APPLICATION FILED MAR. 17, 1909.

928,568.

Patented July 20, 1909.
2 SHEETS—SHEET 2.

WITNESSES:
H. A. Lamb.
M. T. Loydew.

INVENTOR
Wm. A. Widmer
BY
ATTORNEY

UNITED STATES PATENT OFFICE.

WILLIAM A. WIDMER, OF DANBURY, CONNECTICUT.

VARIABLE-SPEED GEARING.

No. 928,568.      Specification of Letters Patent.      Patented July 20, 1909.

Application filed March 17, 1909. Serial No. 483,976.

*To all whom it may concern:*

Be it known that I, WILLIAM A. WIDMER, a citizen of the United States, residing at Danbury, in the county of Fairfield and State of Connecticut, have invented certain new and useful Improvements in Variable-Speed Gearing; and I do hereby declare the following to be a full, clear, and exact description of the invention, such as will enable others skilled in the art to which it appertains to make and use the same.

My invention relates to certain improvements in variable speed gearing, and has for its object to provide a very simple and efficient gearing of this description which may be readily controlled by the operator, and with these ends in view my invention consists in the combination and arrangement of parts hereinafter fully described and then particularly pointed out in the claims which conclude this description.

Figure 3:
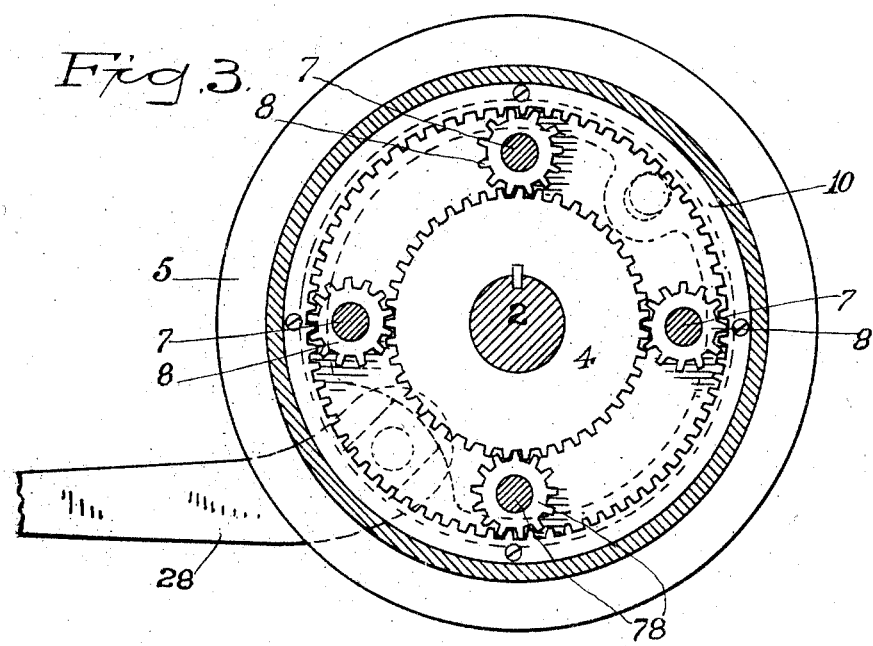
Figure 4:
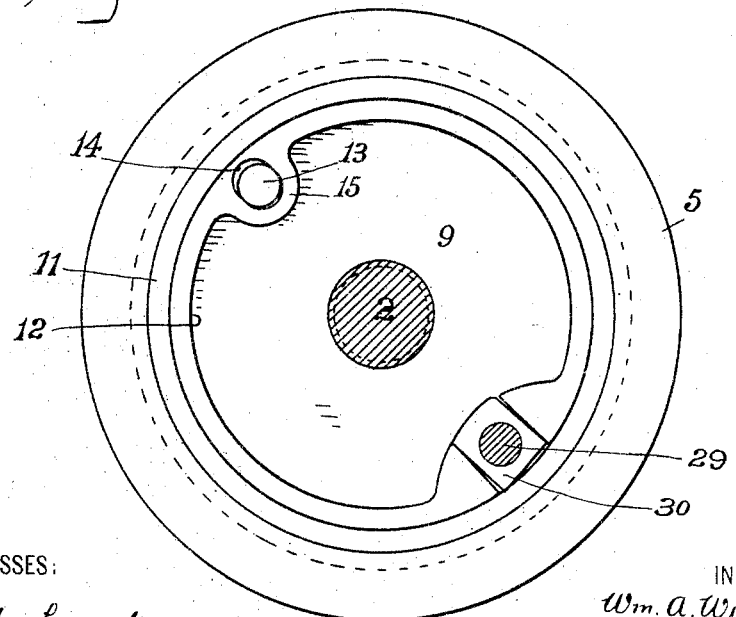

In the accompanying drawing Figure 1 is a side elevation of my improvement— Fig. 2 a view partly in plan and partly in horizontal section—Fig. 3 a detail vertical section at the line $x$, $x$, of Fig. 2, and Fig. 4 a detail vertical section at the line $y$, $y$, of Fig. 2.

Similar numbers of reference denote like parts in the several figures of the drawing.

1 is the casing of any suitable engine and 2 is the engine shaft which is preferably equipped at its outer extremity for the use of any suitable crank 3 for starting the same.

4 is a large gear tight on the shaft 2, and 5 is a pulley whose hub 6 is loosely journaled around the shaft 2, said pulley carrying studs 7 around which are loosely journaled pinions 8 which mesh with the gear 4.

9 is a disk loose around the shaft 2 and 10 is a ring secured to said disk and having gear teeth on its inner circumference with which teeth the pinions 8 mesh. The disk 9 has a flange 11 which projects outwardly from its periphery and contained within this flanged portion is an expansible annulus 12 which is held as against improper crawling by means of the stud 13 which extends from the side of the disk through a slot 14, the latter being slightly enlarged so as to allow for the expansion and contraction of the annulus and being formed in a small ear 15 integral with the annulus.

16 is a collar secured to the shaft 2 and having a head 17 rigid therewith, and 18 is an ordinary cone clutch splined on said collar and capable of free sliding movements thereon. 19 is a pin extending from said head and 20 is a coil spring around said pin and extending within a recess 21 in said clutch, the extremities of said spring bearing respectively against the head and the inner wall of said recess so that the resiliency of the spring will cause the clutch to be normally projected so as to engage with the beveled surface 22 formed on the inside periphery of the outer portion of the pulley 5. There are three sets of pins 19, coil springs 20, and recesses 21 which are in triangular disposition, as shown in dotted lines at Fig. 1, this being advisable in order to make the clutch well balanced and properly operative, as is usual in clutches of this description. This form of clutch is very ordinary and its function is to normally engage the power pulley directly with the engine shaft.

23 is the speed controlling lever pivoted at 24 to the engine casing and having rigid therewith and depending therefrom a plate 25 cut away at or about its central portion, as seen at 26.

28 is a lever pivoted at its inner end around a stud 29 that projects from the engine casing, and 30 is a cam block secured to said end and projecting between the terminals of the annulus 12, so that it will be clear that when said lever is rocked on its pivotal point said block will be operated to expand the annulus or release the same as the case may be.

31 is a link having within its upper end an elongated slot 32 (shown in dotted lines at Fig. 1) through which slot extends a pin 33 (also shown in dotted lines) from one side of the plate 25, for the purpose presently to be explained.

34 is a rib which extends from a boss 35 which latter is rigidly secured to the pivot pin 24, and 36 is a lever pivoted to said boss in such manner as to be capable of swinging movements in a plane at right angles to the swinging movements of the lever 23. The inner end of this lever 36 terminates in a yoke 37 which extends part way around the hub of the clutch 18, the extremities of said yoke being provided with rolls 38 which project immediately inside of a flange 39 formed on the outer portion of said hub so that it will be clear that the swinging movements of said lever will cause the clutch to be released or engaged, as the case may be. The outer extremity of this lever 36 is elbow shaped (as shown in dotted lines at Fig. 2) and passes through the cut away portion 26 in the plate 25, and the wall of this cut away portion immediately below the elbow part of this lever when the latter is in normal position is beveled as seen at 40, so that it will be readily understood that when the lever 23 is elevated said bevel will come in contact with this elbow portion and cause the lever 36 to be swung on its pivotal point to withdraw the clutch from engagement with the pulley. The rib 34 backs up and reinforces the lever 36 so that the same will swing evenly and cannot become sprung.

Presupposing the parts of my improvement to be in the position shown at Figs. 1 and 2 of the drawing, the clutch being in engagement with the pulley, the latter will be operated at the high speed directly from the shaft of the engine.

In shifting to low speed, the lever 23 is raised, thereby causing the bevel 40 to swing the lever 36 and disengage the clutch from the pulley, and when during this movement of the lever 23 the pin 33 is impinged against the upper wall of the slot 32 the lever 28 will be swung on its pivotal point 29 thereby causing the cam block 30 to operate against the terminals of the annulus 12 and expand the latter firmly against the flange 11 of the disk 9, and since this disk will be held stationary the pinions 8 revolved by the gear 4 will travel within the internal gear 10 and thereby revolve the pulley at a low speed. Neutral position is effected by shifting the lever 23 midway between the points at which high and low speeds are obtained whereby the clutch and annulus are freed from the pulley and disk respectively.

I have illustrated my improvement as embodied in a form that is suitable for a motor cycle but I do not wish to be limited in this respect since it will be clear that my invention may be utilized in various ways.

Having thus described my invention what I claim as new and desire to secure by Letters Patent is:—

1. A variable gearing, comprising an engine shaft, a power pulley loose around said shaft, a plurality of pinions carried by said pulley, a disk loosely journaled around said shaft, an internal gear carried by said disk, a gear wheel rigid with said shaft and meshing with said pinions, a spring actuated clutch slidably mounted on said shaft and revolving therewith and normally locked with said pulley, and means for withdrawing the clutch and holding the disk from rotation.

2. The herein described variable speed gearing, comprising an engine shaft, a gear wheel carried thereby, a disk loose on said shaft, an internal gear ring rigid with said disk, a power pulley loosely journaled around said shaft, pinions carried by said pulley and meshing with said wheel and ring, a clutch rigid with said shaft but having a sliding connection therewith, a spring element whereby said clutch is normally engaged with said pulley, an expansible annulus adjacent to said disk and normally free therefrom, a shifting lever, means operated by said lever for expanding said annulus against said disk, and means operated by said lever for releasing said clutch.

In testimony whereof I affix my signature in presence of two witnesses.

WILLIAM A. WIDMER.

Witnesses:
CHAS. H. P. WIDMER,
D. T. CORBETT.